April 7, 1953     W. J. TRETHEWAY     2,634,182
PORTABLE FOLDING OVEN TABLE
Filed July 8, 1949     2 SHEETS—SHEET 1
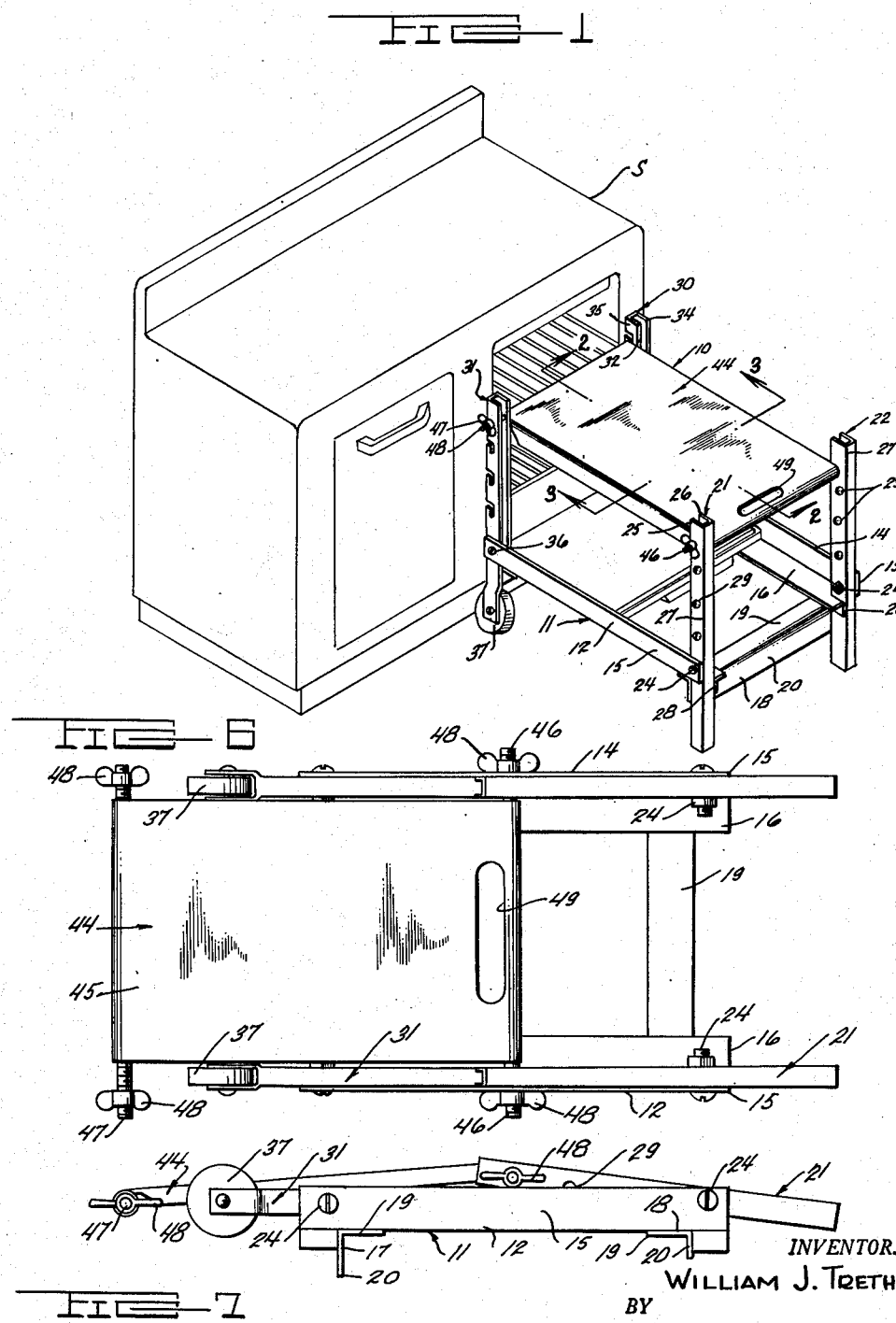
INVENTOR.
WILLIAM J. TRETHEWAY
BY
McMorrow, Berman + Davidson
ATTORNEYS April 7, 1953   W. J. TRETHEWAY   2,634,182
PORTABLE FOLDING OVEN TABLE
Filed July 8, 1949   2 SHEETS—SHEET 2
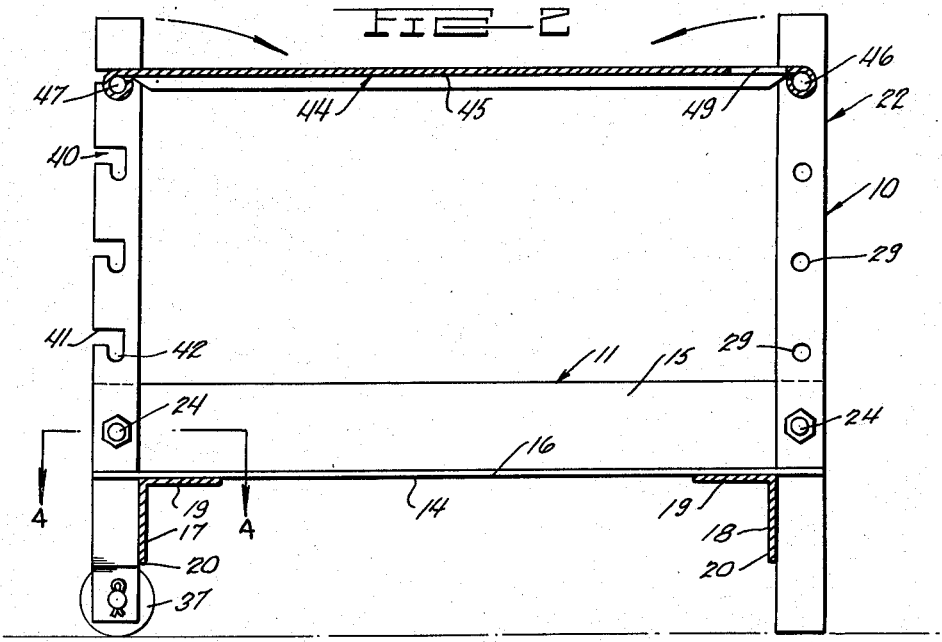
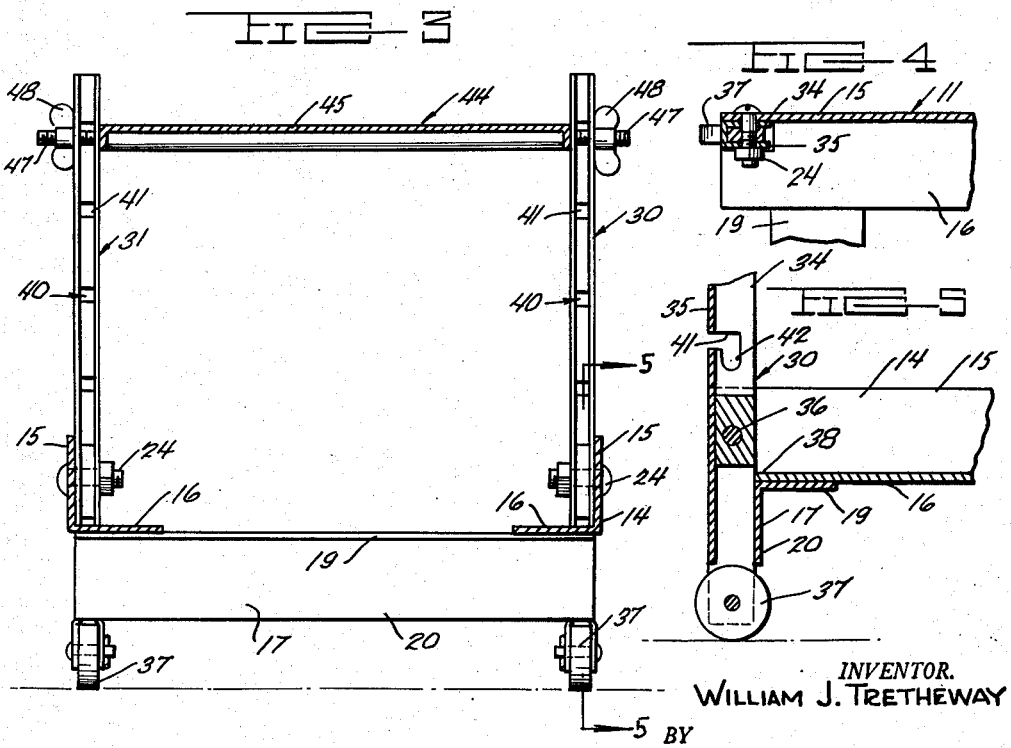
INVENTOR.
WILLIAM J. TRETHEWAY
BY
McMorrow, Berman + Davidson
ATTORNEYS Patented Apr. 7, 1953

2,634,182

UNITED STATES PATENT OFFICE 2,634,182

PORTABLE FOLDING OVEN TABLE

William J. Tretheway, Great Falls, Mont.

Application July 8, 1949, Serial No. 103,607

1 Claim. (Cl. 311—77)

This invention relates to a folding cart, and more particularly to a portable and folding oven cart.

It is an object of this invention to provide a folding cart of the kind to be more particularly described hereinafter for suitably transporting trays or other articles to and from an oven or the like.

Another object of this invention is to provide a cart of this kind which is foldable from a substantially flat folded position to a rigid and erect extended position for carrying articles.

Still another object of this invention is to provide a folding cart of this kind which is light in weight for easy carrying about and foldable to be stored in a restricted space, yet rigid in its extended position for securely supporting articles or trays many times the weight of the cart and having the hinged folding parts arranged for engagement to preclude the possibility of the cart collapsing by folding inadvertently or accidentally.

A further object of this invention is to provide a cart or carriage of this kind which is readily adapted to be used as a utility cart while preparing meals or for other household applications for a device of this kind, as carrying cleaning equipment or the like. A most desirable feature of the use of this device is that a person cannot burn his hands or arms while sliding cooking utensils from the oven onto the cart, as the cart will at no time be positioned within the oven.

With the above and other objects in view, my invention consists in the arrangement, combination and details of construction disclosed in the drawings and specification, and then more particularly pointed out in the appended claim.

In the drawings:

Figure 1 is a perspective view of the folding cart constructed according to an embodiment of this invention, positioned for inserting articles into an oven or removing them therefrom;

Figure 2 is a longitudinal section of the folding cart taken on the line 2—2 of Figure 1;

Figure 3 is a transverse section taken on the line 3—3 of Figure 1;

Figure 4 is a fragmentary detail section taken on the line 4—4 of Figure 2;

Figure 5 is a fragmentary detail section taken on the line 5—5 of Figure 3;

Figure 6 is a top plan view of the oven cart in its folded position;

Figure 7 is a side elevation of the folded cart.

Referring to the drawings, the numeral 10 designates generally a foldable oven cart constructed according to an embodiment of my invention for carrying or transporting trays of food or other articles to be deposited in the oven of a stove S and for wheeling the trays of food about in the kitchen or house. The foldable cart 10 is formed to be folded from its fully-extended, rigid position shown in Figures 1 and 2 to a collapsed or retracted, folded position shown in Figures 6 and 7. The formation of the folding cart 10 is such that when the top or tray-carrying portion of the cart is secured in its extended position in the extended position of the legs of the cart, the cart will be rigidly supported in its extended positions so that the cart will not inadvertently or accidentally be collapsed or folded due to the weight of the articles supported or engaged on the upper surface thereof.

The folding cart 10 is formed of a base frame member 11 formed of angled side and end frame members. The side frame members 12 and 14 are formed of angle iron, each having an upwardly-extending outer flange 15 and a horizontal inwardly-extending lower flange 16 fixed to or formed integrally with the extreme lower edge of the longitudinal outer flange. The end frame members 17 and 18 are each formed with a horizontal, inwardly-extending upper flange 19 and a vertically-extending depending flange 20 at the rear edge of the horizontal flange 19. The upper surface of each of the transverse horizontal flanges 19 is fixedly secured, at its opposite ends to the lower surface of each of the inwardly-extending lower horizontal flanges of the side frame members 12.

A pair of supporting legs 21 and 22 are pivotally supported intermediate the lengths thereof on one, the rear, end of the base frame 11 by pivotal engagement with the rear ends of the side frame members 12. A pivot pin 24 is loosely engaged through each of the legs 21 and 22 intermediate the lengths thereof and through one end of the vertically-extending flange 15 of each of the side frame members 12 and 14.

Each of the supporting legs 21 and 22 is substantially U-shaped in configuration, opening inwardly of the base frame 11 and including a pair of side arms 25 and 26 connected together by an outer bight portion 27. The inwardly-extending horizontal flange 16 of each of the longitudinally-extending side frame members 12 and 14 is formed with a cut-out portion or notch 28 below the pivot pin 24 extending through the vertically-extending flanges 15 immediately adjacent thereto for receiving the lower end of each of the legs 21 and 22 in their upwardly-extending position. The lower portion of each of the legs 21 and 22 is adapted to be abuttingly engaged on the outer surface of the depending flange 20 of the transverse end frame member 18, constituting a stop element or stop means for limiting the swinging pivoted movement of the legs 21 and 22 from a folded position overlying the flanges 16 of the longitudinal frame members to an upwardly-extending vertical position, as clearly shown in Figures 1 and 2 of the drawings.

Each of the vertically-extending supporting legs 21 and 22 is formed with a pair of transversely-aligned apertures or openings 29 along the length thereof for the purposes to be more particularly described hereinafter. The openings 29 in each of the legs 21 and 22 are formed through the side flanges 25 and 26 of each of the leg members and the pairs in each leg member are adapted to be transversely aligned on a horizontal plane with the similar apertures or openings 29 in the flanges of the corresponding adjacent supporting leg member.

A second pair of legs 30 and 31 are pivotally supported on the other ends of the longitudinal side frame members 12 and 14. Each of the legs 30 and 31 is also U-shaped in configuration, as the legs 21 and 22, including side flanges 32 and 34 connected together by a rear bight portion 35. A pivot pin or bolt 36 is engaged through the other ends of the side flanges 15 of the longitudinally-extending side frame members 12 and 14 and engages through the flanges 32 and 34 of the legs 30 and 31 intermediate the length thereof for pivotally supporting the legs 30 and 31 on the front end of the frame member 11. Wheels 37 are rotatably supported on the extreme lower ends of the legs 30 and 31 providing a wheeled cart of this kind for suitably rolling the cart 10 when the rear legs 21 and 22 are lifted from the floor or other fixed surface. The inwardly-extending flanges 16 of the side frame members 12 and 14 at the ends on which the legs 30 and 31 are pivoted are formed with outwardly-opening recesses 38 at the extreme outer ends thereof within which the lower portions of the legs 30 and 31 are adapted to be slidably engaged when the legs are pivoted from their folded to their extended position. The lower ends of the legs 30 and 31 are adapted to abuttingly engage the depending flange 20 of the adjacent transverse frame member 17 which limits the swinging of the legs 30 and 31 from a horizontal position overlying the longitudinally-extending side frame members 12 and 14 to a vertically-extending extended position in the same manner as the flange 20 of the transverse frame member 18 limits the swinging of the legs 21 and 22 described above.

Each of the legs 30 and 31 is formed with a plurality of L-shaped bayonet slots 40 along the length thereof above the pivot pins 36. The bayonet slots 40 are formed with outwardly-extending, horizontal slot portions 41 which are communicated at their inner ends with the upper end of a vertically-extending slot portion 42. The vertically-extending slot portions 42 are formed in the side arms 32 and 34 of each of the legs 30 and 31, while the horizontally-extending slot portion 41 is formed from the bight portion 35 and the side arms 32 and 34 at the upper ends of the vertically-extending slot portions 32. The bayonet slots 42 in each of the legs 30 and 31 are disposed in transverse planar alignment, while the lower ends of the vertically-extending slot portions 42 are disposed in the same longitudinal alignment as the apertures or openings 29 of the legs 21 and 22 for holding a top member 44 in a substantially level position.

The top 44 is formed of a horizontal flat plate 45 having a transverse pin 46 extending outwardly from the opposite sides thereof at one end and a similar pin 47 extending outwardly from the opposite sides of the other end. The pins or bolts 46 fixed on the plate 45 are adapted to be extended through selected pairs of transversely-aligned openings 29 in the legs 21 and 22, while the pins 47 are adapted to be engaged in the bayonet slots 40 which correspond to the selected openings 29, whereby the top 44 will be disposed in a substantially horizontal position parallel to the base frame member 11. Wing nuts 48 are threadably engaged on the outer ends of each of the bolts 46 and 47 for properly tightening the bolts in their selected positions. The wing nuts 48 need not be totally removed from any of the bolts or pins when the part 10 is changed from its extended to its folded position, but the wing nuts need only be loosened for providing a loose pivotal movement of the top 44 about the pins 46 and the disengagement of the pins 47 from the slots 40.

In the use and operation of the portable folding oven cart 10 described above, in the extended position thereof, as shown in Figures 1 through 5 of the drawings, suitable cooking utensils may be placed on the top 44 to be slidably disposed within the oven of the stove S. In the use of the cart 10 with stoves having horizontally-swingable oven doors, no trouble is encountered with the door open, as the cart 10 may be disposed in alignment with the oven opening and the door will be disposed on one side of the cart 10. With ovens having vertically-swingable doors, the door may be disposed between the legs of the cart, and the cart, if the proper size, will suitably accommodate the door therebetween.

The level of the top 44 may be adjusted so that it will be on a same horizontal plane as a selected one of the grates within the oven so that the kitchen utensils to be changed from the cart to the oven may be merely slid along the length of the top 44 and onto the grates within the oven. By disposing the top 44 in this manner, the heated utensils may be slid from the grates onto the top and there will be no occasion for the person using the folding oven cart to touch the oven or the cooking utensil at any other place than the handle for sliding it onto the cart. In this manner, the person using the folding cart 10 may preserve himself from injury frequently experienced in the handling of cooking utensils from ovens.

For folding the cart 10, the wing nuts 48 are initially loosened on their respective bolts 46 and 47 and the pins 47 are slid outwardly from the bayonet slots 40. This is accomplished by pivoting the legs 30 and 31 inwardly about their pivot pins 36 so that the legs 30 and 31 will overlie the inwardly-extending, horizontal flange 16 of the longitudinally-extending side frame members 12 and 14. The other legs 21 and 22 will then be pivoted inwardly about their pivot pins 24 for overlying the inwardly-extending flange 16 of the longitudinal side frame members 12 and 14 and overlying the folded legs 30 and 31. The top 44 loosely pivoted on the upper ends of the legs 21 and 22 will then be loosely extended beyond the extreme lower ends of the legs 30 and 31 and beyond the wheels 37 supported thereon. In the folded position of the oven cart 10, a substantially flat device is provided, as clearly shown in Figure 7 of the drawings, which may be suitably contained in a restricted space, as a small closet, when not in use.

The top 44 is formed with a hand-gripping opening 49 adjacent one end thereof through which the fingers of a person may be extended for moving the cart about either in its extended or in its folded position.

I do not mean to confine myself to the exact details of construction herein disclosed, but claim all variations falling within the purview of the appended claim.

I claim:

A folding cart comprising a rectangular frame including side members and end members secured at their ends to said side members at the respectively opposite ends of said frame and disposed substantially perpendicular to said side members, supporting legs pivoted intermediate their length to said side members at the ends of the latter and disposed one pair at each end of said frame, said legs being swingable from a position adjacent to and extending along the side members to a position in which they are substantially perpendicular to the latter, said frame including portions engageable with said legs for limiting the swinging of said legs to said substantially perpendicular position, a flat top member having one end disposed between the pair of legs at one end of said frame and its other end disposed between the pair of legs at the other end of said frame, means pivotally connecting said one end of said top member to the corresponding pair of legs, and means releasably connecting the other end of said top member to the legs between which said other end is received for rigidly securing said legs in position substantially perpendicular to said frame and said top member in position spaced from and substantially parallel to said frame, said frame comprising angle iron members with one flange of each end member depending perpendicularly from the side members near the corresponding end of said frame, and each of said side members having in each end thereof a leg receiving notch, said notches extending from the corresponding ends of the side members to the adjacent end members so that the depending flanges of said end members constitute the frame portions limiting the swinging movements of said legs to said substantially perpendicular position.

WILLIAM J. TRETHEWAY.

REFERENCES CITED

The following references are of record in the file of this patent:

UNITED STATES PATENTS

| Number | Name | Date |
| --- | --- | --- |
| 695,851 | Woods et al. | Mar. 18, 1902 |
| 890,311 | Stockham | June 9, 1908 |
| 1,063,521 | Everett | June 3, 1913 |
| 1,474,250 | Folliard | Nov. 13, 1923 |
| 2,206,857 | Wagner | July 2, 1940 |
| 2,506,896 | Shakowitz | May 9, 1950 |

FOREIGN PATENTS

| Number | Country | Date |
| --- | --- | --- |
| 568,638 | France | Mar. 29, 1924 |